United States Patent [19]
Ohnishi

[11] Patent Number: 5,973,873
[45] Date of Patent: *Oct. 26, 1999

[54] MOTOR SPEED CONTROL CIRCUIT FOR A VIDEOCASSETTE RECORDER

[75] Inventor: Yasuyuki Ohnishi, Kyoto, Japan

[73] Assignee: Rohm Co., Ltd., Kyoto, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/726,221

[22] Filed: Oct. 4, 1996

[30] Foreign Application Priority Data

Oct. 6, 1995 [JP] Japan .................................. 7-259621

[51] Int. Cl.⁶ .............................. G11B 21/04; H04N 5/95
[52] U.S. Cl. .......................... 360/70; 360/75; 360/73.06; 386/86; 386/14
[58] Field of Search .................................. 360/70, 73.06, 360/73.14, 75, 73.07; 386/14, 78, 79, 81, 86, 87, 88

[56] References Cited

U.S. PATENT DOCUMENTS

| | | | |
|---|---|---|---|
| 5,231,548 | 7/1993 | Yamada et al. | 360/70 |
| 5,239,245 | 8/1993 | Lee | 360/70 |
| 5,319,500 | 6/1994 | Yu | 360/70 X |
| 5,459,622 | 10/1995 | Tajima et al. | 360/70 |

*Primary Examiner*—Andrew L. Sniezek
*Attorney, Agent, or Firm*—Nikaido Marmelstein Murray & Oram LLP

[57] ABSTRACT

In a motor control circuit for a VCR, a microcomputer calculates a center frequency to be targeted by a drum motor based on frequency pulses from the capstan motor, and generates a speed control signal for the drum motor based on a frequency deviation of the drum motor from the center frequency. Thus, in the motor control circuit, color misplacement occurring during a tape speed change is eliminated easily and surely.

7 Claims, 7 Drawing Sheets

MOTOR SPEED CONTROL CIRCUIT FOR A VIDEOCASSETTE RECORDER

BACKGROUND OF THE INVENTION

1. Field of the Invention

The present invention relates to a motor control circuit for a VCR (videocassette recorder).

2. Description of the Prior Art

In VCRs, a drum motor and a capstan motor are usually controlled by separate control systems. Accordingly, if the feed speed of a magnetic tape, which is fed by a capstan rotated by the capstan motor, and the scanning speed of a magnetic head, which is attached on a drum rotated by the drum motor, deviate from predetermined speeds relative to each other, the time intervals between horizontal synchronizing signals included in a reproduced video signal fluctuate. That is, the horizontal frequency $f_H$ fluctuates. In order to compensate for such fluctuation of $f_H$, it is necessary to compensate the speeds of the drum motor and the capstan motor relative to each other. And, the $f_H$ compensation, as required in special playback modes such as search modes, usually assumes constant speeds in the motors. While the motors are changing their speeds, the $f_H$ compensation is corrected differently for the drum control system and the capstan control system in accordance with their different responses. For this reason, the amount of $f_H$ compensation during a transient change of the search speed is often different between the two control systems, causing color misplacement in images reproduced during the transient speed change.

For example, when the speed is switched from a high-speed search A to a low-speed search B, the drum-side frequency changes rapidly from the frequency for search A to that for search B, as shown by the curve (a) in FIG. 1, whereas the capstan-side frequency changes slowly, as shown by the curve (b). This difference between the change rates is the cause of color misplacement that occurs during a speed change.

In a conventional circuit, this problem is solved by applying forced braking to the capstan control system to adjust the capstan-side change characteristic (a) to the drum-side change characteristic (b). Specifically, as shown in FIG. 2, in an early period T of a speed change, forced braking is applied to the capstan motor to make it decelerate rapidly so that the capstan-side change characteristic (b) is adjusted to the drum-side change characteristic (a). Here, the forced braking is realized by using a 'heavier' filter (that is, a filter with a larger time constant) provided somewhere in the path of the speed control signal.

However, the conventional circuit is defective in that, since the rate of the speed change (thus the response of the speed change) depends on how much braking is applied, it not only necessitates much cut-and-try effort on the designer's part but also often causes characteristics variations among circuits produced.

SUMMARY OF THE INVENTION

An object of the present invention is to provide a motor control circuit for VCRs with which color misplacement occurring during a speed change can be prevented easily and surely.

To achieve the above object, according to the present invention, a motor control circuit calculates a center frequency to be targeted by a drum motor based on capstan motor frequency pulses (CFG pulses), and outputs a speed deviation of the drum motor relative to the center frequency as a speed control signal for the drum motor.

According to the above construction, the center frequency can be determined anytime as long as the capstan motor is rotating and thus generating CFG pulses. In addition, the center frequency is updated every time a single CFG pulse occurs, and accordingly the speed deviation signal of the drum motor is also updated every time a single CFG pulse occurs. This means that the speed of the drum motor is controlled finely at time intervals of the CFG pulses. As a result, the drum-side frequency is approximated to the capstan-side frequency to such a degree that color misplacement is substantially eliminated.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
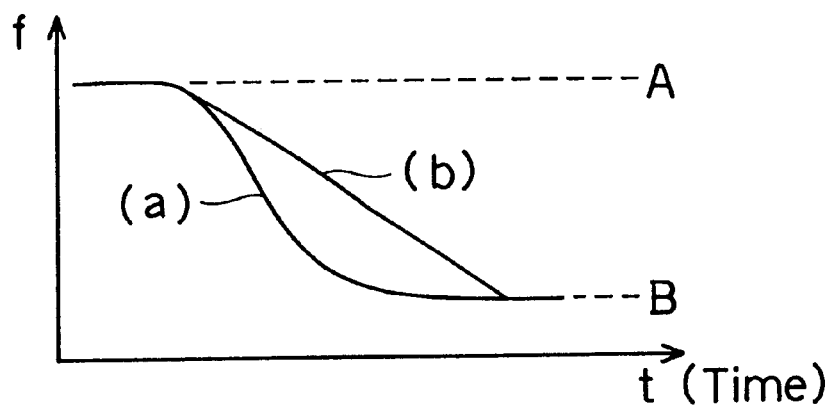
FIG. 1 is a diagram showing an operation of a conventional motor control circuit.
Figure 2:
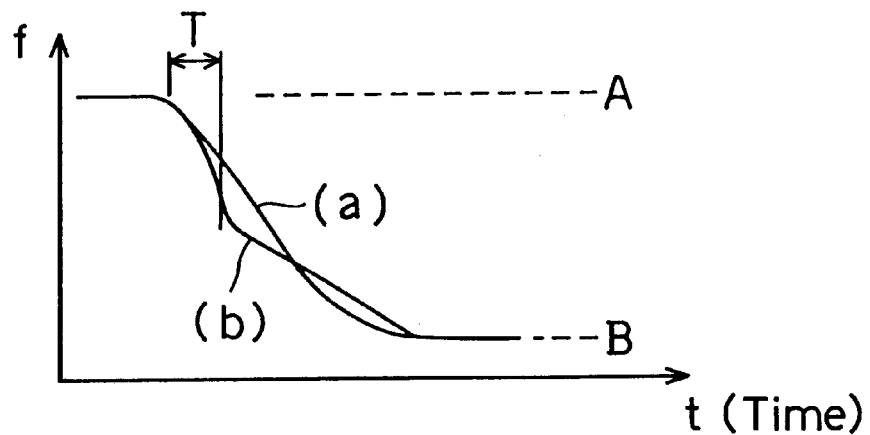
FIG. 2 is a diagram showing an operation of another conventional motor control circuit.
Figure 3:
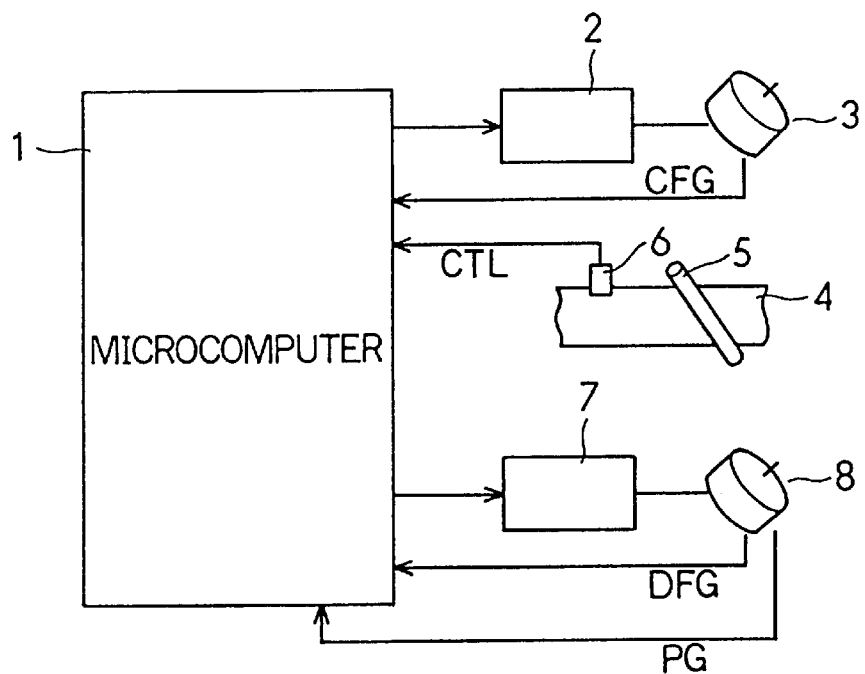
FIG. 3 is a block diagram showing a motor control circuit for a VCR according to the present invention.

In FIG. 3, reference numeral 1 represents a microcomputer. Reference numeral 2 represents a drive circuit controlled by the microcomputer 1 to drive capstan motor 3. The capstan motor 3 generates capstan FG pulses (CFG pulses), and feeds them to the microcomputer 1. Reference numeral 4 represents a magnetic tape. Reference numeral 5 represents a capstan, which is directly controlled by the motor 3. Reference numeral 6 represents a control head for reproducing a control signal (CTL signal) from the magnetic tape 4.

The control head 6 reproduces a CTL signal, and feeds it to the microcomputer 1. Reference numeral 7 represents a drive circuit controlled by the microcomputer 1 to drive a drum motor 8. The drum motor 8, while rotating, generates drum FG pulses (DFG pulses), which are fed to the microcomputer 1.

The microcomputer 1 generates a speed control signal for the capstan motor 3 based on the CFG pulses, and a phase control signal for the capstan motor 3 based on the CTL signal. The microcomputer 1 then forms a composite signal from these speed control and phase control signals, and outputs it to control the rotation of the capstan motor 3 by way of the drive circuit 2. Moreover, the microcomputer 1 calculates, based on the CFG pulses, a speed center frequency that is to be targeted by the drum motor 8.

Subsequently, the microcomputer 1 outputs a signal representing the deviation (difference) of the current speed, which is obtained based on the DFG pulses, relative to the calculated center frequency, in order to output it as a speed control signal for the drum motor 8. The microcomputer 1 then forms a composite signal from this speed control signal and the phase control signal, which is obtained based on the PG pulses, and feeds it to the drive circuit 7 to control the drum motor 8.

As described above, the motor control circuit of the present invention is definitely different from the conventional circuit in that the $f_H$ compensation of the speed control signal for the drum motor 8 is controlled based on the CFG pulses. This control is kept functioning as long as CFG pulses are available. When no CFG pulses are available, as in the case where only the drum motor 8 is rotating and the capstan motor 3 is at rest (for example, during playback of a still image), the speed control signal is formed based on a drum-motor center frequency that is calculated without CFG pulses.

Next, a description will be given below as to the procedure for calculating the center frequency to be targeted by the drum motor 8 based on the CFG pulses. First, the factor by which the current speed of the capstan motor 3 is faster than the targeted capstan frequency is calculated. Suppose that W stands for the speed factor to be calculated, then $$W = \frac{\left(\begin{array}{c}\text{Current Frequency}\\ \text{of the Capstan Motor}\end{array}\right)}{\left(\begin{array}{c}\text{Reference Frequency}\\ \text{for the}\\ \text{Capstan Motor}\end{array}\right) \times \left(\begin{array}{c}f_H \text{ Compensation Rate}\\ \text{for the Capstan Motor}\\ \text{in a particular mode}\end{array}\right)} \quad (1)$$

The frequency in the numerator of the formula (1) is calculated based on CFG pulses. The denominator of the formula (1) represents the target frequency for the capstan motor. The target frequency is calculated as follows:

$$\left(\begin{array}{c}CTL \text{ Signal}\\ \text{Frequency}\end{array}\right) \times \left(\begin{array}{c}\text{Number of}\\ \text{Motor Poles}\end{array}\right) \times \left(\begin{array}{c}\text{Mode}\\ \text{Constant}\end{array}\right) \times \left(\begin{array}{c}f_H \text{ Compensation Rate}\end{array}\right) \quad (2)$$

Here, the mode constant and the $f_H$ compensation rate are stored in the memory beforehand. Next, suppose that $D_1$ stands for the $f_H$ compensation rate for the drum, then $$D_1 = \frac{1}{1 + \alpha \times (1-W) / \left(\begin{array}{c}\text{Number of Scanning}\\ \text{Lines per field}\end{array}\right)} \quad (3)$$

Note however that $\alpha$ is a value unique to each of the modes, such as SP mode, LP mode, and EP mode, which are available in the VCR, and that the number of scanning lines is 262.5 for the NTSC system, and 312.5 for the PAL system. The target center frequency $D_2$ for the drum motor is calculated as follows:

$$D_2 = D_1 \times \left(\begin{array}{c}\text{Reference Period}\\ \text{of the Drum Motor}\end{array}\right). \quad (4)$$

Here, the reference period of the drum motor is determined based on the set model of the VCR and the video signal system used by it. The set model is determined by the number of revolutions and the number of poles of the cylinder. The difference between the above-mentioned target center frequency $D_2$ and the current frequency of the drum motor forms the speed deviation error signal for the drum motor.

Figure 5:
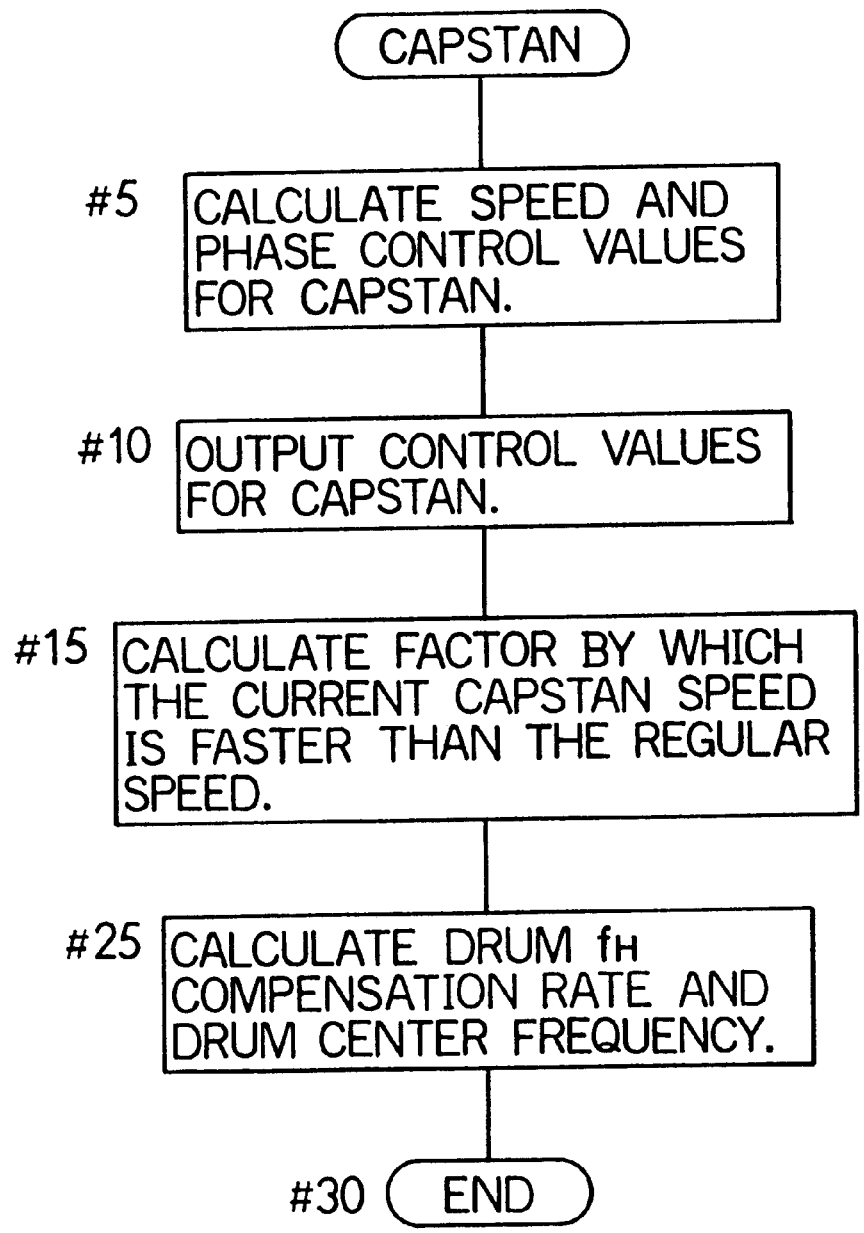
FIG. 5 is a flowchart showing the control operation for the capstan system performed by the microcomputer of the motor control circuit of the present invention.

Next, a description will be given below as to the control operation of the microcomputer 1 with reference to the flowcharts, FIGS. 5 and 6. FIG. 5 shows the operation flow for the capstan system. First, in step #5, the speed control value and the phase control value for the capstan motor are calculated, and, in step #10, the calculated control values are output. The capstan motor 3 is controlled based on these control values. Note however that, during a speed change such as occurs when the search speed is switched, the capstan motor 3 is not phase-controlled.

Steps #15 to #25 are processes performed by the capstan system to control the drum motor 8. In step #15, the factor by which the current capstan speed is faster than the regular speed is calculated. This calculation is performed according to the formula (1). Next, in step #25, the $f_H$ compensation rate $D_1$ for the drum and the target center frequency $D_2$ for the drum are calculated. The $f_H$ compensation rate $D_1$ for the drum is calculated according to the formula (3), and the target center frequency $D_2$ for the drum is calculated according to the formula (4). On completion of these calculations, the operation flow proceeds to step #30, ending the flow there.

Figure 6:
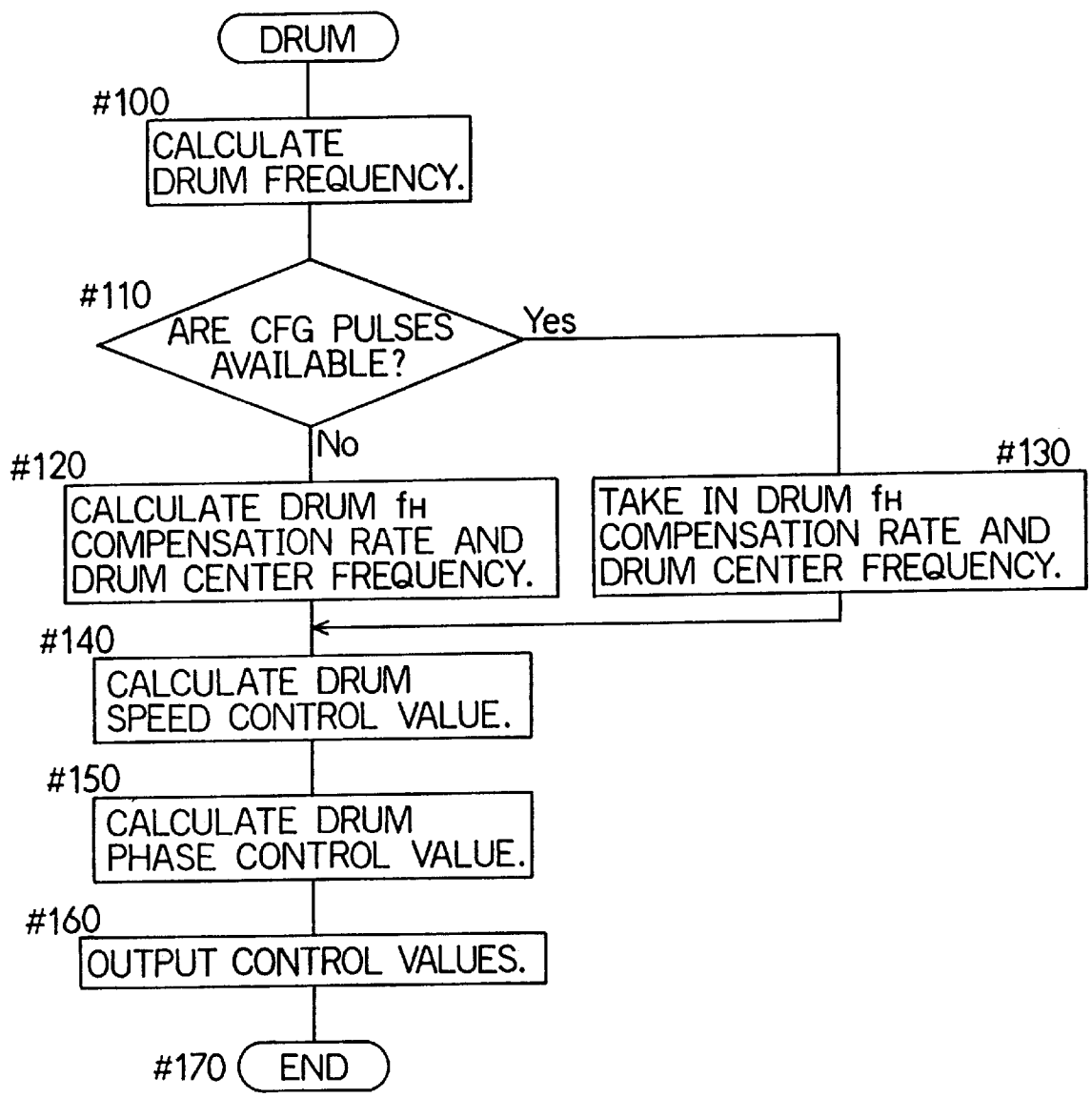
FIG. 6 is a flowchart showing the control operation for the drum system performed by the microcomputer of the motor control circuit of the present invention.

FIG. 6 shows the operation flow for the drum. First, in step #100, the drum frequency is calculated based on the DFG pulses. Next, in step #110, whether CFG pulses are available or not is checked. If CFG pulses are available, then, in step #130, the $f_H$ compensation rate $D_1$ for the drum motor and the target center frequency $D_2$ for the drum motor are read in. The $f_H$ compensation rate $D_1$ for the drum motor and the center frequency $D_2$ for the drum motor have already been calculated in step #25, as described above.

On completion of step #130, the operation flow proceeds to step #140, where the drum speed control value is calculated. This value is calculated by determining the difference between the above-mentioned target center frequency for the drum motor and the current drum frequency calculated in step #100.

In step #110 above, if CFG pulses are not available, the operation flow proceeds to step #120, where the $f_H$ compensation rate $D_1$ and the target center frequency $D_2$ for the drum motor are calculated. In this case, since the formula (1) gives W=0, the $f_H$ compensation rate $D_1$ is calculated according to the formula (3), substituting W=0 for W there. Based on the thus calculated $f_H$ compensation rate $D_1$, the target center frequency $D_2$ for the drum motor is calculated. The operation flow then proceeds to step #140.

In step #140, the difference between the target center frequency $D_2$ for the drum motor as calculated in step #120 above and the drum frequency as calculated in step #100 above is determined. On completion of step #140, the operation flow proceeds to step #150, where the phase control value for the drum motor is calculated. Since this phase control value for the drum motor is well-known, no description will be given in this respect. In step #160, the speed control value and the phase control value are output to control the drum motor 8.

Figure 4:
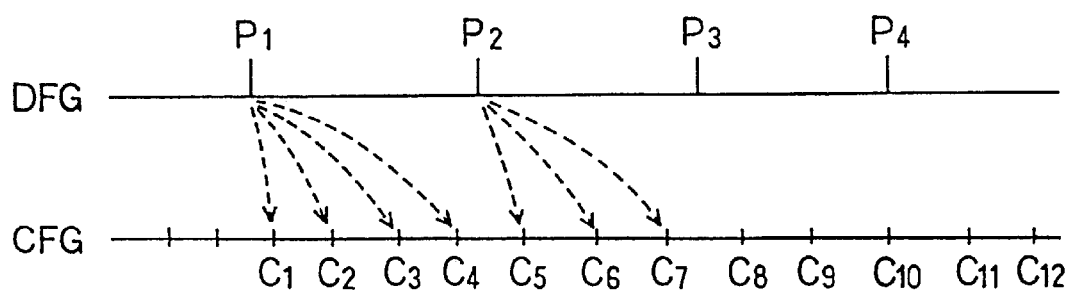
FIG. 4 is a diagram showing the operation of the motor control circuit of the present invention.

In a conventional circuit, the deviation signal for the drum motor is updated only at the times when pulses P1, P2, P3, . . . are applied, as shown in FIG. 4. In the present invention, the deviation signal for the drum motor is updated even in the periods between those pulses. For example, in the period between P1 and P2, there exist four pulses, C1, C2, C3, and C4, as CFG pulses. And, every time a pulse, C1, C2, C3, or C4, is received, the target center frequency for the drum motor is calculated and the speed deviation is determined, so that the speed control signal is updated.

Figure 7:
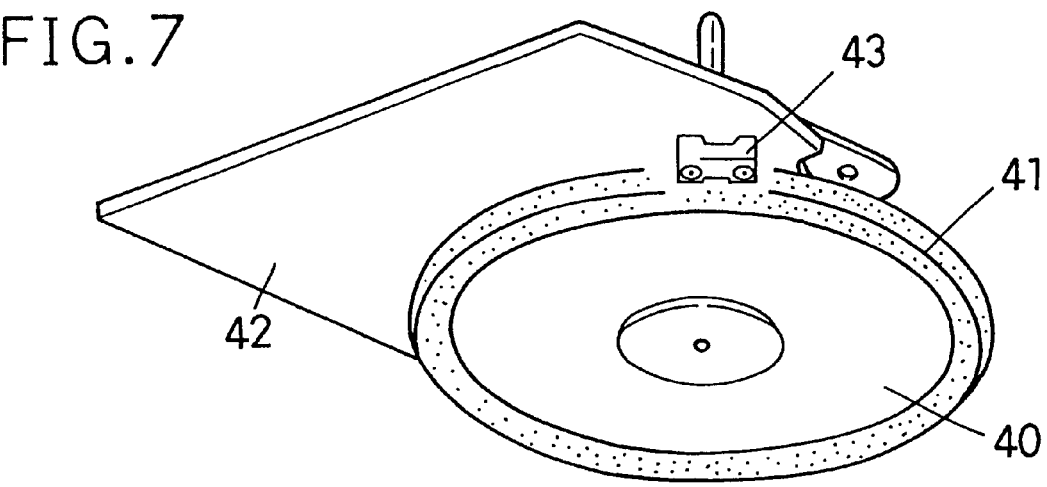
FIG. 7 is a diagram showing the construction provided in the capstan motor to generate a capstan frequency signal.
Figure 8:
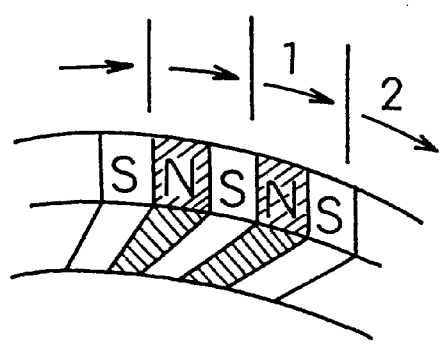
FIG. 8 is a diagram showing the magnets provided in the rotor shown in FIG. 7.
Figure 9:
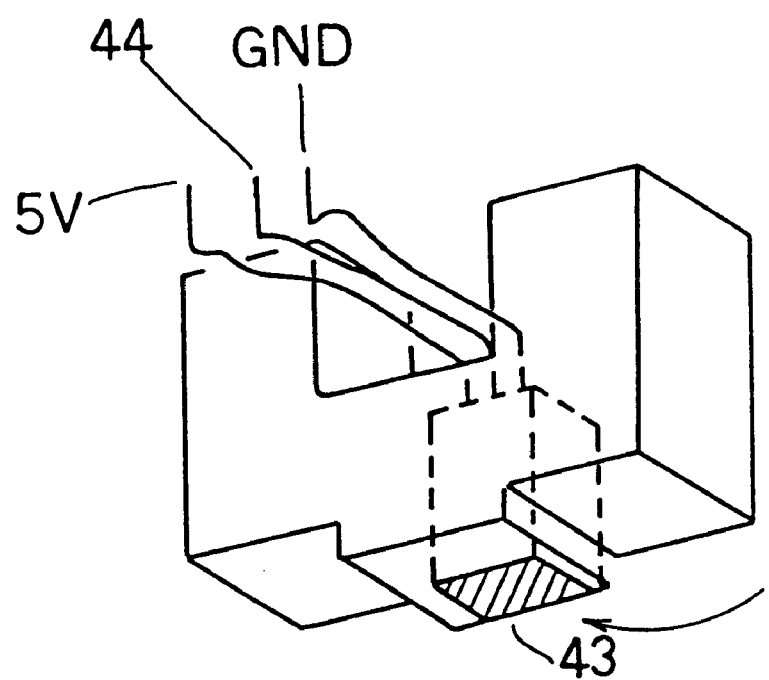
FIG. 9 is a diagram showing a magnetic resistance device.

FIGS. 7 to 9 shows a construction for generating a CFG signal from the capstan motor 3. As shown in FIG. 7, along the periphery 41 of a rotor 40 of the capstan motor 3 are formed magnets of alternating S and N poles. On the other hand, a magnetic resistance device 43 mounted on a circuit board 42 generates sine-curve waves as a CFG signal, and delivers them to a terminal 44. These sine-curve waves are then formed into pulses to be used as CFG pulses.

Figure 10:
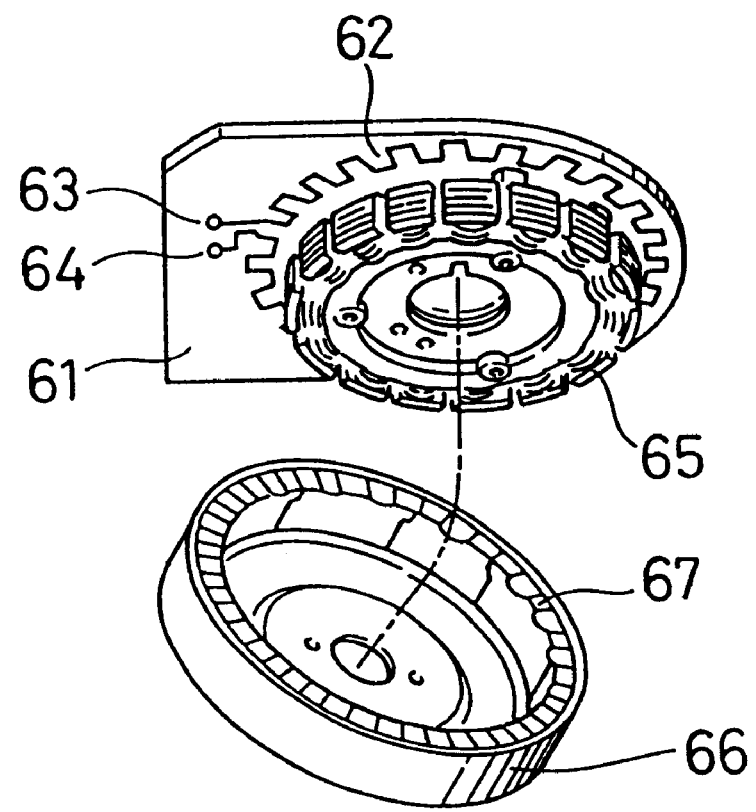
FIG. 10 is a diagram showing the construction provided in the drum motor to generate a drum frequency signal.

FIG. 10 shows a construction for generating a DFG signal. Reference numeral 61 represents a stator substrate. On the stator substrate 61, a stator 65 is mounted and an FG pattern 62 is formed. Reference numerals 63 and 64 represent output terminals of the DFG signal. Reference numeral 66 represents a rotor. Reference numeral 67 represents magnets facing the FG pattern 62. The stator 65 and the rotor 66 composes the motor 8 in FIG. 3.

As described above, according to the present invention, the speed control signal for the drum motor is obtained based on capstan-side information, and, in addition, it is updated every time a single CFG pulse occurs. As a result, the drum-side frequency is approximated to the capstan-side frequency to such a degree that color misplacement is substantially eliminated.

What is claimed is:

1. A motor speed control system for a videocassette recorder, comprising:
    a capstan system including
        a capstan motor,
        means for generating capstan frequency pulses in accordance with rotation of the capstan motor,
        a capstan rotated by the capstan motor;
    a magnetic head for reproducing a CTL signal from a magnetic tape fed by the capstan;
    a drum motor for driving the drum;
    means for generating drum frequency pulses in accordance with rotation of the drum motor; and
    control means for calculating a horizontal frequency compensation rate and a target center frequency for the drum motor based on said capstan frequency pulses and for calculating a drum speed control value based on said horizontal frequency compensation rate and said target center frequency for the drum motor every time said capstan frequency pulse is received in order to output the drum speed control value and when said capstan frequency pulse is not received, said control means for controlling said drum motor independently of said capstan system,
    wherein said horizontal frequency compensation rate for the drum motor is calculated as $$D_1 = \frac{1}{1 + \alpha x (1 - W)/(\text{Number of Scanning Lines per field})}$$

where $D_1$ is the horizontal frequency compensation rate, $\alpha$ is a value unique to each mode, and W is the speed factor by which the current speed of the capstan is faster than the target capstan frequency.

2. A motor speed control system as claimed in claim 1, wherein said control means is a microcomputer.

3. A motor speed control system according to claim 1, wherein W is calculated as $$W = \frac{(\text{Current Frequency of the Capstan Motor})}{\left(\begin{array}{c}\text{Reference Frequency} \\ \text{for the} \\ \text{Capstan Motor}\end{array}\right) \times \left(\begin{array}{c}\text{Horizontal Frequency} \\ \text{Compensation Rate} \\ \text{for the Capstan Motor} \\ \text{in a particular mode}\end{array}\right)}.$$

4. A motor speed control system according to claim 1, wherein the target capstan frequency is calculated as $$(CTL\ \text{Signal Frequency}) \times (\text{Number of Motor Poles}) \times (\text{Mode Constant}) \times (\text{Horizontal Frequency Compensation Rate}).$$

5. A motor speed control system according to claim 1, wherein a target capstan frequency $D_2$ is calculated as $$D_2 = D_1 \times \frac{(\text{Reference Period})}{\text{of the Drum Motor}}.$$

6. A motor speed control system according to claim 1, wherein when said capstan frequency pulse is not received, said control means for calculating the drum speed control value based on a drum motor center frequency which is calculated without capstan frequency pulses.

7. A motor speed control system according to claim 1, wherein W is calculated as current frequency of the capstan motor divided by target frequency of the capstan motor.

* * * * *